(12) United States Patent
Wong

(10) Patent No.: US 11,250,424 B2
(45) Date of Patent: Feb. 15, 2022

(54) SYSTEMS AND METHODS FOR CREATING SUBTOKENS USING PRIMARY TOKENS

(71) Applicant: Visa International Service Association, San Francisco, CA (US)

(72) Inventor: Erick Wong, Menlo Park, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 1398 days.

(21) Appl. No.: 15/158,926

(22) Filed: May 19, 2016

(65) Prior Publication Data

US 2017/0337549 A1 Nov. 23, 2017

(51) Int. Cl.
*G06Q 20/38* (2012.01)
*G06F 21/62* (2013.01)
*G06Q 20/22* (2012.01)
*G06Q 20/36* (2012.01)
*H04L 9/32* (2006.01)

(52) U.S. Cl.
CPC ....... *G06Q 20/383* (2013.01); *G06F 21/6245* (2013.01); *G06F 21/6254* (2013.01); *G06F 21/6263* (2013.01); *G06Q 20/2295* (2020.05); *G06Q 20/367* (2013.01);
(Continued)

(58) Field of Classification Search
None
See application file for complete search history.

(56) References Cited

U.S. PATENT DOCUMENTS

| 5,280,527 A | 1/1994 | Gullman |
| 5,613,012 A | 3/1997 | Hoffman |

(Continued)

FOREIGN PATENT DOCUMENTS

| EP | 1028401 A2 | 8/2000 |
| EP | 2156397 A1 | 2/2010 |

(Continued)

OTHER PUBLICATIONS

International Search Report and Written Opinion, dated Aug. 29, 2017, in PCT/US2017/033353, 13 pages.
(Continued)

*Primary Examiner* — Jacob C. Coppola
(74) *Attorney, Agent, or Firm* — Kilpatrick Townsend & Stockton LLP

(57) ABSTRACT

According to one embodiment of the invention, a subtoken corresponding to a primary token is generated. The primary token corresponds to a credential. The credential may be, for example, a primary account number (PAN) corresponding to a payment account. The subtoken may be a temporary, one-time use subtoken based on a primary token associated with the credential that allows a user to conduct a transaction from his or her account, while still providing security for the user's sensitive data. The subtoken may contain a header and an obfuscated portion. The header of the subtoken routes the subtoken to the entity issuing the subtoken for translation into the primary token. The obfuscated portion acts as a pointer to the primary token and data associated with the primary token. A same check digit may be included in the subtoken, the primary token, and the credential, in order to ensure that the transaction is not improperly denied.

21 Claims, 7 Drawing Sheets

(52) U.S. Cl.
CPC ....... *G06Q 20/385* (2013.01); *G06Q 20/3821* (2013.01); *H04L 9/3213* (2013.01)

(56) References Cited

U.S. PATENT DOCUMENTS

| | | | |
|---|---|---|---|
| 5,781,438 A | 7/1998 | Lee |
| 5,883,810 A | 3/1999 | Franklin |
| 5,930,767 A | 7/1999 | Reber |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,453,301 B1 | 9/2002 | Niwa |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Hogg et al. |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |

(56) References Cited

U.S. PATENT DOCUMENTS

| | | |
|---|---|---|
| 8,433,116 B2 | 9/2013 | Davis et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,751,642 B2 | 6/2014 | Vargas |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,600,817 B2* | 3/2017 | Bondesen .......... G06Q 20/3224 |
| 9,646,303 B2 | 5/2017 | Karpenko |
| 9,680,942 B2 | 6/2017 | Dimmick |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0081039 A1* | 4/2005 | Lee .................. H04L 9/3263 713/176 |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048953 A1* | 2/2009 | Hazel .................. G07F 7/1008 705/35 |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |

(56) References Cited

U.S. PATENT DOCUMENTS

| | | |
|---|---|---|
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0191248 A1 | 8/2011 | Bishop et al. |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1* | 5/2012 | Killian .................. G06Q 20/40 705/44 |
| 2012/0129514 A1 | 5/2012 | Beenau |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226802 A1 | 8/2013 | Hammad |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |

(56) References Cited

U.S. PATENT DOCUMENTS

| | | | |
|---|---|---|---|
| 2013/0311382 A1 | 11/2013 | Fosmark | |
| 2013/0317982 A1 | 11/2013 | Mengerink | |
| 2013/0332344 A1 | 12/2013 | Weber | |
| 2013/0339253 A1 | 12/2013 | Sincai | |
| 2013/0346305 A1 | 12/2013 | Mendes | |
| 2013/0346314 A1 | 12/2013 | Mogollon | |
| 2013/0346320 A1* | 12/2013 | Jin | G06Q 20/10 705/76 |
| 2014/0007213 A1 | 1/2014 | Sanin | |
| 2014/0013106 A1 | 1/2014 | Redpath | |
| 2014/0013114 A1 | 1/2014 | Redpath | |
| 2014/0013452 A1 | 1/2014 | Aissi et al. | |
| 2014/0019352 A1 | 1/2014 | Shrivastava | |
| 2014/0025581 A1 | 1/2014 | Calman | |
| 2014/0025585 A1 | 1/2014 | Calman | |
| 2014/0025958 A1 | 1/2014 | Calman | |
| 2014/0032417 A1 | 1/2014 | Mattsson | |
| 2014/0032418 A1 | 1/2014 | Weber | |
| 2014/0040137 A1 | 2/2014 | Carlson | |
| 2014/0040139 A1 | 2/2014 | Brudnicki | |
| 2014/0040144 A1 | 2/2014 | Plomske | |
| 2014/0040145 A1 | 2/2014 | Ozvat | |
| 2014/0040148 A1 | 2/2014 | Ozvat | |
| 2014/0040628 A1 | 2/2014 | Fort | |
| 2014/0041018 A1 | 2/2014 | Bomar | |
| 2014/0046853 A1 | 2/2014 | Spies | |
| 2014/0047551 A1 | 2/2014 | Nagasundaram et al. | |
| 2014/0052532 A1 | 2/2014 | Tsai | |
| 2014/0052620 A1 | 2/2014 | Rogers | |
| 2014/0052637 A1 | 2/2014 | Jooste | |
| 2014/0068706 A1 | 3/2014 | Aissi | |
| 2014/0074637 A1 | 3/2014 | Hammad | |
| 2014/0108172 A1 | 4/2014 | Weber et al. | |
| 2014/0114857 A1 | 4/2014 | Griggs et al. | |
| 2014/0143137 A1 | 5/2014 | Carlson | |
| 2014/0164243 A1 | 6/2014 | Aabye et al. | |
| 2014/0188586 A1 | 7/2014 | Carpenter et al. | |
| 2014/0249945 A1 | 9/2014 | Gauthier | |
| 2014/0294701 A1 | 10/2014 | Dai et al. | |
| 2014/0297534 A1 | 10/2014 | Patterson | |
| 2014/0310183 A1 | 10/2014 | Weber | |
| 2014/0324690 A1 | 10/2014 | Allen et al. | |
| 2014/0330721 A1 | 11/2014 | Wang | |
| 2014/0330722 A1 | 11/2014 | Laxminarayanan et al. | |
| 2014/0331265 A1 | 11/2014 | Mozell et al. | |
| 2014/0337236 A1 | 11/2014 | Wong et al. | |
| 2014/0344153 A1 | 11/2014 | Raj et al. | |
| 2014/0372308 A1 | 12/2014 | Sheets | |
| 2015/0019443 A1 | 1/2015 | Sheets et al. | |
| 2015/0032625 A1 | 1/2015 | Dill | |
| 2015/0032626 A1 | 1/2015 | Dill | |
| 2015/0032627 A1* | 1/2015 | Dill | G06Q 20/40 705/44 |
| 2015/0046338 A1 | 2/2015 | Laxminarayanan | |
| 2015/0046339 A1 | 2/2015 | Wong et al. | |
| 2015/0052064 A1 | 2/2015 | Karpenko et al. | |
| 2015/0081544 A1 | 3/2015 | Wong et al. | |
| 2015/0088756 A1 | 3/2015 | Makhotin et al. | |
| 2015/0095367 A1* | 4/2015 | Mattsson | H04L 63/00 707/769 |
| 2015/0106239 A1 | 4/2015 | Gaddam et al. | |
| 2015/0112870 A1 | 4/2015 | Nagasundaram et al. | |
| 2015/0112871 A1 | 4/2015 | Kumnick | |
| 2015/0120472 A1 | 4/2015 | Aabye et al. | |
| 2015/0127529 A1 | 5/2015 | Makhotin et al. | |
| 2015/0127547 A1 | 5/2015 | Powell et al. | |
| 2015/0140960 A1 | 5/2015 | Powell et al. | |
| 2015/0142673 A1 | 5/2015 | Nelsen et al. | |
| 2015/0161597 A1 | 6/2015 | Subramanian et al. | |
| 2015/0178724 A1 | 6/2015 | Ngo et al. | |
| 2015/0178819 A1* | 6/2015 | Kassemi | G06Q 10/107 705/26.82 |
| 2015/0180836 A1 | 6/2015 | Wong et al. | |
| 2015/0186864 A1 | 7/2015 | Jones et al. | |
| 2015/0193222 A1 | 7/2015 | Pirzadeh et al. | |
| 2015/0195133 A1 | 7/2015 | Sheets et al. | |
| 2015/0199679 A1 | 7/2015 | Palanisamy et al. | |
| 2015/0199689 A1 | 7/2015 | Kumnick et al. | |
| 2015/0220917 A1 | 8/2015 | Aabye et al. | |
| 2015/0235211 A1* | 8/2015 | Hurry | G06Q 20/40975 705/75 |
| 2015/0269566 A1* | 9/2015 | Gaddam | G06Q 20/385 705/67 |
| 2015/0278799 A1 | 10/2015 | Palanisamy | |
| 2015/0287037 A1 | 10/2015 | Salmon | |
| 2015/0312038 A1 | 10/2015 | Palanisamy | |
| 2015/0319158 A1 | 11/2015 | Kumnick | |
| 2015/0324736 A1 | 11/2015 | Sheets | |
| 2015/0332262 A1 | 11/2015 | Lingappa | |
| 2015/0356560 A1 | 12/2015 | Shastry et al. | |
| 2015/0363781 A1 | 12/2015 | Badenhorst | |
| 2016/0028550 A1* | 1/2016 | Gaddam | H04L 9/3215 713/173 |
| 2016/0036790 A1 | 2/2016 | Shastry et al. | |
| 2016/0042263 A1 | 2/2016 | Gaddam et al. | |
| 2016/0065370 A1 | 3/2016 | Le Saint et al. | |
| 2016/0092696 A1 | 3/2016 | Guglani et al. | |
| 2016/0092872 A1 | 3/2016 | Prakash et al. | |
| 2016/0092874 A1 | 3/2016 | O'Regan | |
| 2016/0103675 A1 | 4/2016 | Aabye et al. | |
| 2016/0119296 A1 | 4/2016 | Laxminarayanan et al. | |
| 2016/0125397 A1 | 5/2016 | Strydom et al. | |
| 2016/0132878 A1 | 5/2016 | O'Regan | |
| 2016/0140545 A1 | 5/2016 | Flurscheim et al. | |
| 2016/0148197 A1 | 5/2016 | Dimmick | |
| 2016/0148212 A1 | 5/2016 | Dimmick | |
| 2016/0171479 A1 | 6/2016 | Prakash et al. | |
| 2016/0173483 A1 | 6/2016 | Wong et al. | |
| 2016/0197725 A1 | 7/2016 | Hammad | |
| 2016/0210628 A1 | 7/2016 | McGuire | |
| 2016/0217461 A1 | 7/2016 | Gaddam | |
| 2016/0218875 A1 | 7/2016 | Le Saint et al. | |
| 2016/0224976 A1 | 8/2016 | Basu | |
| 2016/0224977 A1 | 8/2016 | Sabba et al. | |
| 2016/0232527 A1 | 8/2016 | Patterson | |
| 2016/0239842 A1 | 8/2016 | Cash et al. | |
| 2016/0269391 A1 | 9/2016 | Gaddam et al. | |
| 2016/0308995 A1 | 10/2016 | Youdale et al. | |
| 2017/0046696 A1 | 2/2017 | Powell et al. | |
| 2017/0076288 A1 | 3/2017 | Awasthi | |
| 2017/0103387 A1 | 4/2017 | Weber | |
| 2017/0109745 A1 | 4/2017 | Al-Bedaiwi | |
| 2017/0148013 A1 | 5/2017 | Rajurkar | |
| 2017/0163617 A1 | 6/2017 | Narayan | |
| 2017/0163629 A1 | 6/2017 | Law | |
| 2017/0186001 A1 | 6/2017 | Reed et al. | |
| 2017/0200156 A1 | 7/2017 | Karpenko | |
| 2017/0200165 A1 | 7/2017 | Narayan | |
| 2017/0201520 A1 | 7/2017 | Chandoor | |
| 2017/0220818 A1 | 8/2017 | Nagasundaram et al. | |
| 2017/0221054 A1 | 8/2017 | Flurscheim | |
| 2017/0221056 A1 | 8/2017 | Karpenko | |
| 2017/0228723 A1 | 8/2017 | Taylor | |
| 2017/0228728 A1 | 8/2017 | Sullivan | |
| 2017/0236113 A1 | 8/2017 | Chitalia | |
| 2017/0293914 A1 | 10/2017 | Girish | |
| 2017/0295155 A1 | 10/2017 | Wong et al. | |
| 2017/0364903 A1 | 12/2017 | Lopez | |
| 2017/0364914 A1 | 12/2017 | Howard | |
| 2017/0373852 A1 | 12/2017 | Cassin | |
| 2018/0006821 A1 | 1/2018 | Kinagi | |
| 2018/0075081 A1 | 3/2018 | Chipman | |
| 2018/0247303 A1 | 8/2018 | Raj | |
| 2018/0262334 A1 | 9/2018 | Hammad | |
| 2018/0268399 A1 | 9/2018 | Spector | |
| 2018/0268405 A1 | 9/2018 | Lopez | |
| 2018/0285875 A1 | 10/2018 | Law | |
| 2018/0324184 A1 | 11/2018 | Kaja | |
| 2018/0324584 A1 | 11/2018 | Lopez | |
| 2019/0020478 A1 | 1/2019 | Girish | |

(56) References Cited

U.S. PATENT DOCUMENTS

| | | |
|---|---|---|
| 2019/0066069 A1 | 2/2019 | Faith |
| 2019/0147439 A1 | 5/2019 | Wang |

FOREIGN PATENT DOCUMENTS

| | | | |
|---|---|---|---|
| KR | 2011 0006732 A | 1/2011 | |
| WO | 2000/014648 A1 | 3/2000 | |
| WO | 2001035304 A1 | 5/2001 | |
| WO | 2001035304 A9 | 5/2001 | |
| WO | 2004/051585 A2 | 11/2003 | |
| WO | 2004042536 A2 | 5/2004 | |
| WO | 2005/001751 A1 | 6/2004 | |
| WO | 2006113834 A2 | 10/2006 | |
| WO | 2009032523 A1 | 3/2009 | |
| WO | 2010078522 A1 | 7/2010 | |
| WO | 2012068078 A2 | 5/2012 | |
| WO | 2012098556 A1 | 7/2012 | |
| WO | 2012142370 A2 | 10/2012 | |
| WO | 2012167941 A1 | 12/2012 | |
| WO | 2013048538 A1 | 4/2013 | |
| WO | 2013056104 A1 | 4/2013 | |
| WO | 2013119914 A1 | 8/2013 | |
| WO | 2013179271 A2 | 12/2013 | |
| WO | WO-2017184121 A1 * | 10/2017 | ......... G06Q 20/3674 |
| WO | WO-2017192122 A1 * | 11/2017 | ......... H04N 21/2541 |

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Dean, et al., U.S. Appl. No. 16/311,144 (unpublished), "Encryption Key Exchange Process Using Access Device," filed Dec. 18, 2018.

Kang, et al., U.S. Appl. No. 16/347,175 (unpublished), "Access Identifier Provisioning to Application," filed May 2, 2019.

Palanisamy, et al., U.S. Appl. No. 16/415,360 (unpublished), "Method and System for Access Token Processing," filed May 17, 2019.

Chitalila, et al., U.S. Appl. No. 16/448,777 (unpublished), "Secure Remote Transaction Framework Using Dynamic Secure Checkout Element," filed Jun. 21, 2019.

Jones, U.S. Appl. No. 16/444,339 (unpublished), "Recurring Token Transactions," filed Jun. 18, 2019.

IN201847045903, "First Examination Report", dated Jul. 26, 2021, 7 pages.

* cited by examiner

SYSTEMS AND METHODS FOR CREATING SUBTOKENS USING PRIMARY TOKENS

CROSS-REFERENCES TO RELATED APPLICATIONS

None.

BACKGROUND

There are instances in which a user may want to mask his or her credentials when performing a transaction. For example, a consumer may want to protect his or her sensitive account information as much as practically possible to deter fraud, which can cause significant losses in time and money for consumers, merchants, and banks. Unauthorized individuals may commit fraud by obtaining credentials without the credential holder's permission, and conducting transactions or withdrawals using those credentials. Thus, secure methods and systems for masking credentials for transactions in a safe and efficient manner are needed.

Token systems can be used to protect credentials by not exposing the credentials when transactions are conducted. In such systems, a token can be used instead of a real credential to conduct a transaction. If the token is obtained by an unauthorized person, the credential is not obtained thereby protecting the underlying account associated with the credential. In such token systems, a token validation cryptogram can be used with the token, and may provide proof that the token is to be used in a particular way (e.g., only for e-commerce transactions). The token validation cryptogram can be validated by a remote server thereby authorizing the use of the token for a given transaction.

While such token systems are effective, there are some situations in which the token and the token validation cryptogram cannot be used. For example, a token might be 19 digits long and a token validation cryptogram may be 5-10 digits long. In the case of a one-dimensional bar code, for example, it is not possible to include all of the information needed for a token transaction in the one-dimensional bar code.

In addition, only a limited number of tokens may be available, making it impossible for a single credential to have multiple associated tokens, especially if each can only be used a limited amount of times for purposes of ensuring security. For example, a token often must have a header that corresponds to the underlying credential (e.g., a multi-digit BIN number identifying the issuing bank), as well as a valid check digit to ensure the token can be processed correctly by existing credential processing systems. Thus, only a limited number of digits (as well as combinations of numbers) are available in the remaining space to be used by both tokens and credentials.

Embodiments of the invention address this and other problems, individually and collectively.

SUMMARY

According to some embodiments of the invention, a first token (e.g., a subtoken) is received by a first server computer. The first token includes a first header and an obfuscated portion. The first header routes the first token to the first server computer. The first server computer uses the obfuscated portion of the first token to produce a second token (e.g., a primary token) and data associated with the second token. The second token includes a second header and a middle portion. The second header is associated with an authorizing entity.

According to one embodiment of the invention, the first server then retrieves a credential associated with the second token. The credential includes the second header and a center portion. The center portion of the credential is different than the middle portion of the second token. The credential is subsequently used to authorize a transaction.

According to another embodiment of the invention, the first server instead sends the second token to a second server computer. The second server computer retrieves the credential associated with the second token. The credential includes the second header and the center portion. The center portion of the credential is different than the middle portion of the second token. The credential is subsequently used to authorize the transaction.

According to some embodiments of the invention, a server computer receives a request for a first token from a communication device. The request includes a second token and data associated with the second token. The second token includes a second header and a middle portion. The second header is associated with an authorizing entity. The server computer generates an obfuscated portion using the second token and the data associated with the second token. The server computer generates the first token includes a first header and the obfuscated portion. The first header is associated with the server computer. The server computer sends the first token to the mobile device.

Embodiments of the invention are further directed to a server computer comprising a processor and a memory element. The memory element can comprise code, executable by the processor, for implementing the above described methods.

These and other embodiments of the invention are described in further detail below.

DETAILED DESCRIPTION

Figure 1:
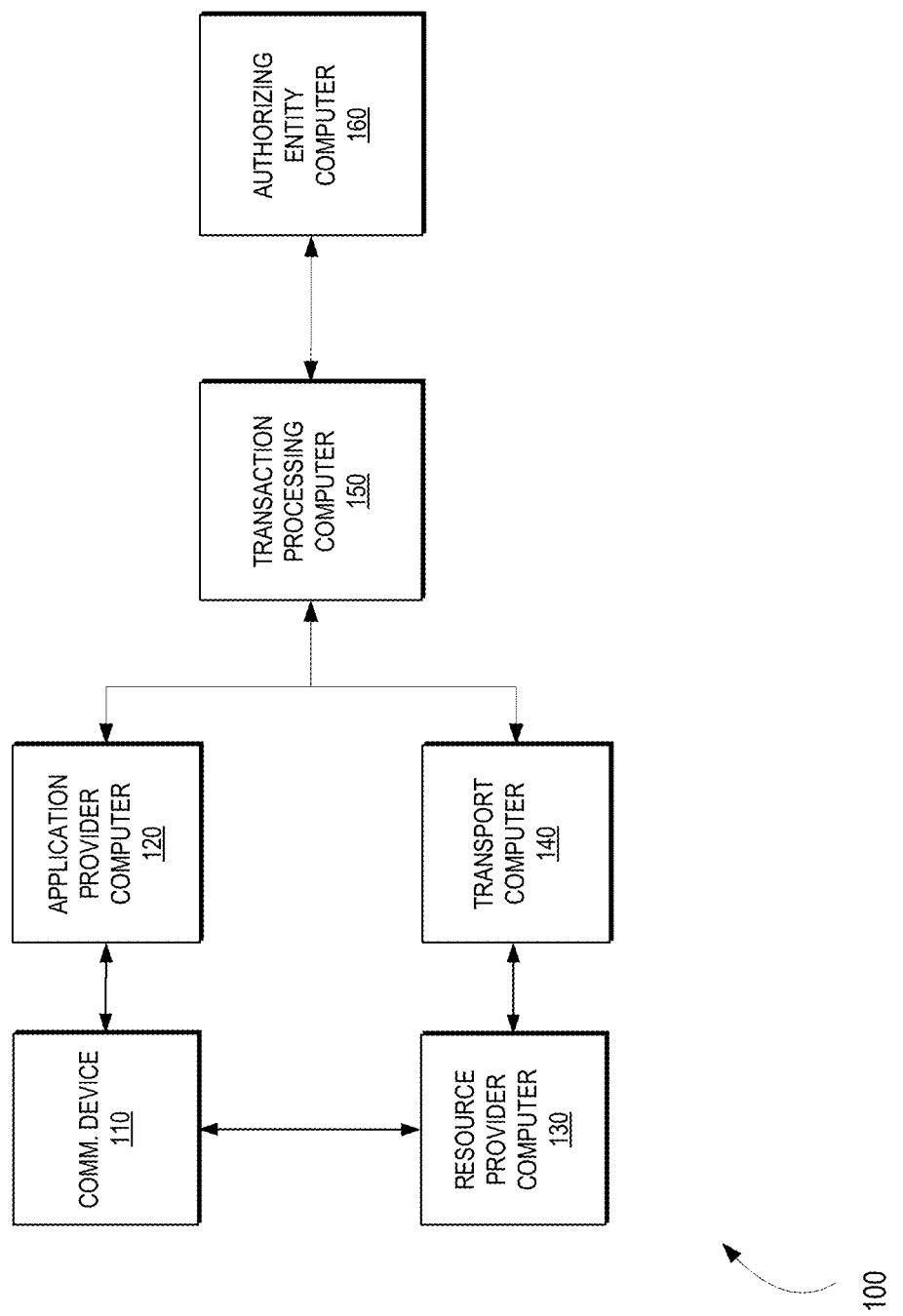
FIG. 1 shows a block diagram of a system according to embodiments of the present invention.

According to one embodiment of the invention, a subtoken corresponding to a primary token is generated. The primary token corresponds to a credential. The credential may be, for example, a primary account number (PAN) corresponding to a payment account. The subtoken may be a temporary, one-time use subtoken based on a primary token associated with the credential that allows a user to conduct a transaction from his or her account, while still providing security for the user's sensitive data. The subtoken may contain a header and an obfuscated portion. The header of the subtoken routes the subtoken to the entity issuing the subtoken for translation into the primary token. The obfuscated portion acts as a pointer to the primary token and data associated with the primary token. A same check digit may be included in the subtoken, the primary token, and the credential, in order to ensure that the transaction is not improperly denied.

Before discussing specific embodiments and examples, some descriptions of terms used herein are provided below.

An "application provider" may be an entity that can provide a service or application. An example of an application provider is a digital wallet provider.

An "authorization request message" may be a message to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, a PIN number, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be a message reply to an authorization request message. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

An "authorizing entity" may be an entity that authorizes a request. Examples of an authorizing entity may be an issuer, a governmental agency, a document repository, an access administrator, etc.

A "bar code" may be an optical machine readable representation of data. Bar codes may represent data by varying widths and spacing of parallel lines, and may be linear or one-dimensional. Bar codes may be scanned by optical scanners called bar code readers. In one embodiment, bar code readers may be comprised in communication devices (e.g., smart phones).

A "check digit" may be a digit used for error detection in identification numbers (e.g., credentials, tokens, etc.). The check digit can consist of a single digit or more than one digit, and may be computed using an algorithm applied to the other digits in the identification number. A check digit may be present anywhere within an identification number. In one embodiment, the check digit is the last digit in an identification number.

A "communication device" may comprise any suitable electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include mobile phones (e.g., cellular phones), PDAs, tablet computers, net books, laptop computers, personal music players, handheld specialized readers, watches, fitness bands, ankle bracelets, rings, earrings, etc., as well as automobiles with remote communication capabilities. A communication device may comprise any suitable hardware and software for performing such functions, and may also include multiple devices or components (e.g., when a device has remote access to a network by tethering to another device—i.e., using the other device as a modem—both devices taken together may be considered a single communication device).

A "credential" may comprise any evidence of authority, rights, or entitlement to privileges. For example, access credentials may comprise permissions to access certain tangible or intangible assets, such as a building or a file. In another example, payment credentials may include any suitable information associated with and/or identifying an account (e.g., a payment account and/or a payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

A "digital wallet" can include an electronic application or device that allows an individual to conduct electronic commerce transactions. A digital wallet may store user profile information, payment credentials, bank account information, one or more digital wallet identifiers, and/or the like, and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites or systems, transferring funds between users, and/or the like. A digital wallet may be designed to streamline the purchase and payment process. A digital wallet may allow the user to load one or more payment cards onto the digital wallet so as to make a payment without having to enter an account number or present a physical card. A digital wallet may also store transaction records (e.g., electronic receipts).

A "header" may be the beginning portion or first portion of an identification number (e.g., a credential, a token, etc.). A header may comprise any number of letters, numbers, and/or symbols. For example, a header of a payment credential may be up to the first 9 digits of the account number.

A header of a payment credential may be used to route an authorization request message to a particular entity (e.g., a transaction processing computer, an authorizing entity computer, etc.).

An "issuer" may typically refer to a business entity (e.g., a bank) that maintains an account for a user. An issuer may also issue payment credentials stored on communications devices.

A "primary token" may include a token that is a substitute identifier for a credential or account identifier. In other words, a primary token may have a direct correlation or association with a credential, such as a PAN, and may be considered a high value token.

"Provisioning" may include a process of providing data for use. For example, provisioning may include providing, delivering, or enabling a token on a communication device. Provisioning may be completed by any entity within or external to the transaction system. For example, in some embodiments, tokens may be provisioned by an issuer or a transaction processing network onto a mobile device. The provisioned tokens may have corresponding token data stored and maintained in a token vault or token registry. In some embodiments, a token vault or token registry may generate a token that may then be provisioned or delivered to a device. In some embodiments, an issuer may specify a token range from which token generation and provisioning can occur. Further, in some embodiments, an issuer may generate and notify a token vault of a token value and provide the token record information (e.g., token attributes) for storage in the token vault.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "server computer" may include a powerful computer or cluster of computers. For example, a server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "subtoken" may include a token that is a substitute identifier for a primary token or another subtoken. It may have the same or different form as the token or subtoken from which it originates. A subtoken, for example, may be the same number of digits as the token with which it is associated, and also like the real account number associated with the token. The subtoken may be linked to a credential via at least a primary token. Because the subtoken may not be directly linked to the credential, it may be considered a low value token.

A "token" may include a substitute identifier for some information. For example, an access token may be a substitute or subordinate identifier for an access credential. In another example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token. A token may include a primary token or a subtoken.

A "token validation cryptogram" may be a cryptogram that can be used to verify the use of a token. In some cases, the token validation cryptogram can be generated by an encryption key such as a limited use key. In some embodiments, the token validation cryptogram may be generated based upon data surrounding the transaction including the time of the transaction, the tokens used to conduct the transaction, and/or the mode of presentment. In some cases, the token validation cryptogram may be dependent on the transaction initiation method and type of application used to initiate the transaction. The token validation cryptogram may be used to ensure a token is being used in the designated transaction channel. For example, a token that is limited to NFC transactions only may be associated with a NFC token validation cryptogram algorithm and if the received token validation cryptogram is not validated with the NFC transaction application, the transaction may be declined. Accordingly, the token validation cryptogram allows for further transaction validation and control and provides for a number of security benefits.

I. Systems

FIG. 1 shows a block diagram of system 100 according to embodiments of the present invention. The system 100 includes a communication device 110, an application provider computer 120, a resource provider computer 130, a transport computer 140, a transaction processing computer 150, and an authorizing entity computer 160. Each of these systems and computers may be in operative communication with each other. The communication device 110 may be operated by a user (not shown).

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

A user may operate communication device 110 to request a subtoken based on a primary token associated with a credential. Once generated, the subtoken may be used by the user of communication device 110 as a substitute for the primary token in conducting transactions.

Communication device 110 may be any device suitable to carry out a financial transaction or any other additional related actions. Communication device 110 may include a memory that may store a mobile wallet application or payment application. The application may be provisioned with account information to enable each mobile device to conduct transactions. Communication device 110 may also include a secure element that can be implemented in either hardware and/or software, which may store sensitive account or personal information. Communication device 110 may communicate over a communication network with one or more entities, including application provider computer 120 and resource provider computer 130.

The application provider computer 120 may be operated by or associated with an application provider. The application provider may be an entity that provides an application to a mobile device for use by a user. In some embodiments, the application provider can be a digital wallet provider that provides a digital wallet or payment application to a mobile device. The application provider computer 120 may maintain one or more digital wallets for each user, and each digital wallet may be associated with payment data for one or more payment accounts. Examples of digital wallets may include Visa Checkout™ or Google™ Wallet, etc.

The application provider computer 120 may comprise a server computer to facilitate the provisioning process. The server computer may include a processor and a computer readable medium coupled to the processor, the computer readable medium comprising code, executable by the processor. The server computer may send and receive over-the-air (OTA) messages to a digital wallet application stored on the communication device 110.

The resource provider computer 130 may be configured to receive transaction data from an access device. Resource provider computer 130 may enable a resource provider such as a merchant to engage in transactions, sell goods or services, or provide access to goods or services to the consumer. The resource provider computer 130 may accept multiple forms of payment and may use multiple tools to conduct different types of transactions. For example, the resource provider computer 130 may communicate with, include, or be an access device at a physical store operated by the merchant for in-person transactions. The resource provider computer 130 may also enable the merchant to sell goods and/or services via a website, and may accept payments over the Internet.

The transport computer 140 is typically a system for an entity (e.g., a bank) that has a business relationship with a particular resource provider (e.g., merchant) or other entity. The transport computer 140 may route the authorization request for a transaction to the authorizing entity computer 160 via transaction processing computer 150. The transport computer 140 may comprise a server computer. The server computer may include a processor and a computer readable medium coupled to the processor, the computer readable medium comprising code, executable by the processor.

The transaction processing computer 150 may be associated with one or more payment service providers. The transaction processing computer 150 may include any entity that provides provisioning or personalization services. For example, the transaction processing computer 150 may maintain a personalization database with user information, and the transaction processing computer 150 may be configured to communicate with one or more authorizing entity computers 160 to determine personalized payment data for users. The transaction processing computer 150, via a provisioning service module, may provide provisioning services to the application provider computer 120, in which the application provider computer 120 may utilize an application programming interface (API) to communicate with the transaction processing computer 150.

The transaction processing computer 150 may comprise a server computer. The server computer may include a processor and a computer readable medium coupled to the processor, the computer readable medium comprising code, executable by the processor.

The authorizing entity computer 160 is typically run by a business entity (e.g., a bank) that may have issued a payment (credit/debit) card, account numbers or payment tokens used for the transactions. Some systems can perform both authorizing entity computer 160 and transport computer 140 functions. When a transaction involves a payment account associated with the authorizing entity computer 160, the authorizing entity computer 160 may verify the account and respond with an authorization response message to the transport computer 140 that may be forwarded to the corresponding access device and the consumer device if applicable.

The authorizing entity computer 160 may comprise a server computer. The server computer may include a processor and a computer readable medium coupled to the processor, the computer readable medium comprising code, executable by the processor. In some embodiments, the authorizing entity computer 160 may communicate with the transaction processing computer 150 to conduct transactions.

At a later time (e.g., at the end of the day), a clearing and settlement process can occur between the transport computer 140, the transaction processing computer 150, and the authorizing entity computer 160.

Figure 2:
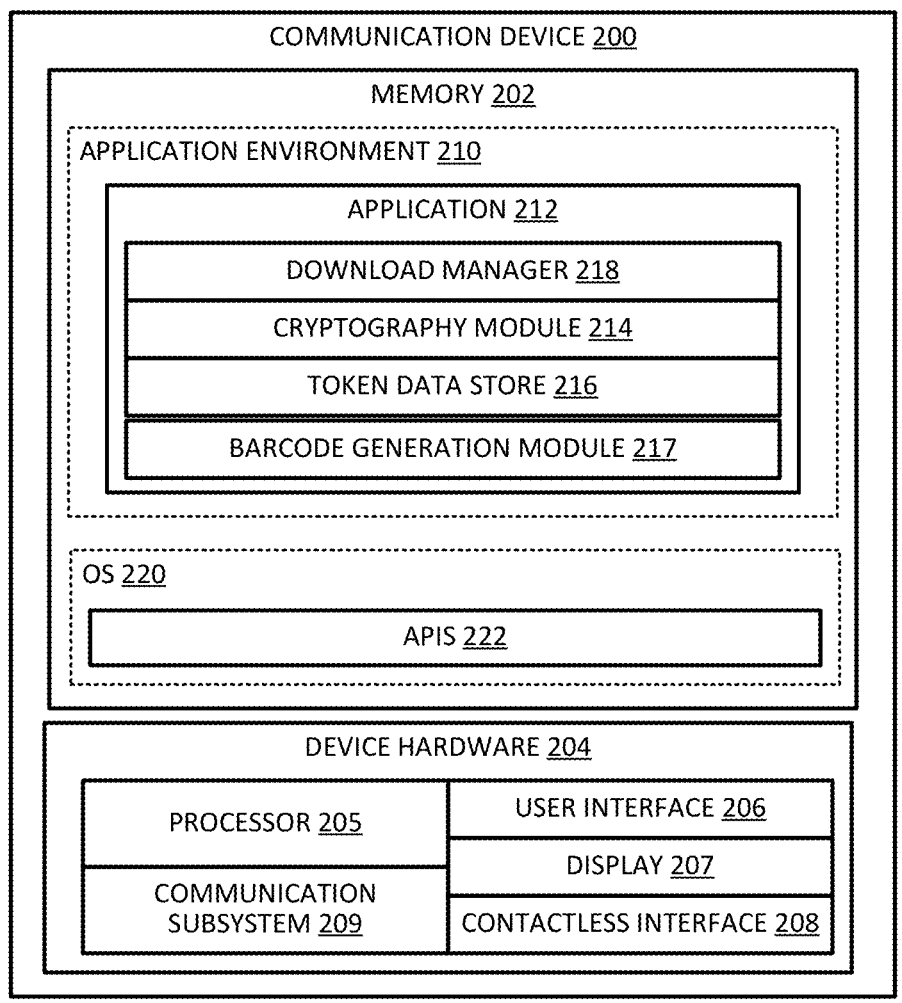
FIG. 2 shows a block diagram of a communication device according to embodiments of the present invention.

FIG. 2 shows a block diagram of a communication device 200 according to embodiments of the present invention. Communication device 200 may be used to implement communication device 110 of FIG. 1, for example. Communication device 200 may include device hardware 204 coupled to a memory 202. Device hardware 204 may include a processor 205, a communications subsystem 209, and a user interface 206. In some embodiments, device hardware 204 may include a display 207 (which can be part of user interface 206). Device hardware 204 may also include a contactless interface 208, for example, in some embodiments in which communication device 200 is a portable communication device. Processor 205 can be implemented as one or more integrated circuits (e.g., one or more single core or multicore microprocessors and/or microcontrollers), and is used to control the operation of communication device 200. Processor 205 can execute a variety of programs in response to program code or computer-readable code stored in memory 202, and can maintain multiple concurrently executing programs or processes. Communications subsystem 209 may include one or more RF transceivers and/or connectors that can be used by portable communication device 200 to communicate with other devices and/or to connect with external networks. User interface 206 can include any combination of input and output elements to allow a user to interact with and invoke the functionalities of communication device 200. In some embodiments, user interface 206 may include a component such as display 207 that can be used for both input and output functions.

Contactless interface 208 may include one or more specialized RF transceivers (e.g., near field communication (NFC) transceivers) to interact with a contactless reader of an access device to conduct a transaction (e.g., payment transaction, access transaction, information exchange, etc.). In secure element based implementations, only a secure element (not shown) may have access to contactless interface 208. In some embodiments, contactless interface 208 can be accessed by the mobile OS 220 using specialized card emulation APIs 222 without requiring the use of a secure element. In some embodiments, display 207 can also be part of contactless interface 208, and is used, for example, to perform transactions using bar codes, QR codes, etc.

Memory 202 can be implemented using any combination of any number of non-volatile memories (e.g., flash memory) and volatile memories (e.g., DRAM, SRAM), or any other non-transitory storage medium, or a combination thereof media. Memory 202 may store an operating system (OS) 220 and an application environment 210 where one or more applications reside including application 212 to be executed by processor 205. In some embodiments, OS 220 may implement a set of card emulation APIs 222 that can be invoked by application 212 to access contactless interface 208 to interact with an access device.

Application 212 can include an application that uses, accesses, and/or stores sensitive information or tokens. For example, application 212 can include a digital wallet or payment application that uses tokens and/or payment credentials to conduct transactions via communication device 200. In some embodiments, access to application 212 by a user can be protected by user authentication data such as a password, passcode, PIN, etc. For example, when a user attempts to launch or execute application 212, the user may be requested to enter valid user authentication data before the user can access application 212. Application 212 may include a download manager 218, a cryptography module 214, a token data store 216, and a bar code generation module 217. In some embodiments, one or more of these components can be provided by another application or component that is not part of application 212.

Download manager 218 can be programmed to provide functionalities to communicate with an application provider associated with application 212 to download information via the application provider. Download manager 218 working in conjunction with the processor 205 may request or otherwise manage the acquisition and/or storage of credentials and/or tokens. For example, download manager 218 working in conjunction with the processor 205 may request and obtain credentials and/or tokens via the application provider associated with application 212, and store the credentials and/or tokens in token data store 216. In some embodiments, the credentials and/or tokens provided by the application provider can be received in an encrypted form. For example, the credentials and/or tokens can be encrypted with a session key generated by a server computer. Download manager 218 working in conjunction with the processor 205 may also receive, from the application provider, the session key in an encrypted form, and store the encrypted session key in token data store 216.

Cryptography module 214 working in conjunction with the processor 205 may provide cryptographic functionalities for application 212. For example, cryptography module 214 may implement and perform encryption/decryption operations for application 212 using encryption algorithms such as DES, AES, TDES, or the like, and/or hash functions such as SHA, or the like. For example, when application 212 accesses token data store 216 to retrieve and use the credentials and/or stored therein (e.g., to conduct a transaction), application 212 may invoke cryptography module 214 to decrypt the session key that is used to encrypt the stored credentials and/or tokens, and then decrypt the underlying information using the decrypted session key. The decrypted credentials and/or tokens can then be used by application 212.

Bar code generation module 217 working in conjunction with the processor 205 may generate bar codes of credentials or tokens to be displayed on display 207 of communication device 200. The bar code may be scanned by an access device at a resource provider to conduct a transaction using the credential or token, as described further herein.

Figure 3:
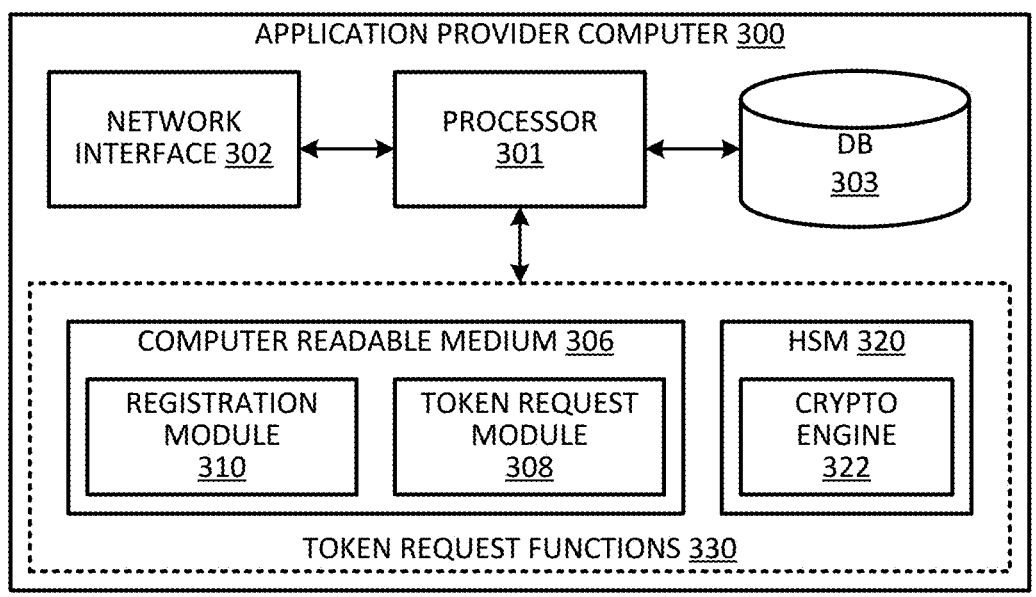
FIG. 3 shows a block diagram of an application provider computer according to embodiments of the present invention.

FIG. 3 shows a block diagram of an application provider computer 300 according to embodiments of the present invention. Application provider computer 300 may be implemented as application provider computer 120 of FIG. 1, for example. Application provider computer 300 may be associated with an application provider. For example, application provider computer 300 can provide a software application or services associated with the application for a communication device. Application provider computer 300 may include a processor 301 coupled to a network interface 302 and a computer readable medium 306. In some embodiments, application provider computer 300 may also include a hardware security module (HSM) 320. Application provider computer 300 may also include or otherwise have access to a user database 303 that may be internal or external to application provider computer 300.

Processor 301 may include one or more microprocessors to execute program components for performing the token request functions 330 of application provider computer 300. Network interface 302 can be configured to connect to one or more communication networks to allow application provider computer 300 to communicate with other entities such as a communication device operated by a user, a transaction processing computer, etc. Computer readable medium 306 may include the same or different components as memory 202 of FIG. 2. Computer readable medium 306 may store code executable by the processor 301 for implementing some or all of the token request functions 330 of application provider computer 300. For example, computer readable medium 306 may include code implementing a registration module 310 and a token request module 308. In some embodiments, application provider computer 300 may also include a hardware security module (HSM) 320 to implement a cryptography engine 322.

Registration module 310 may work in conjunction with the processor 301 to register users with application provider computer 300. For example, a user can be registered with the application provider by providing registration module 310 with user identifying information to identify the user, device information such as a device identifier associated with the user's communication device on which an application associated with the application provider is installed, account or token information such as an account identifier associated with the user's account, etc. In some embodiments, a user may set up user authentication data (e.g., password, passcode, PIN, etc.) using the registration module 310 and the processor 301. The user authentication data can be used by application provider computer 300 to authenticate the user when the application on the user's communication device communicates with application provider computer 300. Registration module 310 may work in conjunction with the processor 301 to also allow a user to change or update the user authentication data. The registration information can be stored in a database 303. In some embodiments, the registration process can be carried out when the user first downloads the application for installation on the user's communication device, or when the user first launches and executes the application.

Token request module 308 is programmed to process requests for tokens received from the application installed on a user's communication device. In some embodiments, upon receiving a request from the application on the user's communication device, token request module 308 in conjunction with the processor 301 may authenticate the user and/or the communication device by verifying the user authentication data and device identifier of the communication device against the previously registered information stored in database 303. Token request module 308 working in conjunction with the processor 301 may then request the token from a server computer (e.g., a token server or a transaction processing computer) for use on the communication device. When token request module 308 receives the token from the server computer, token request module 308 working in conjunction with the processor 301 may send the token to the application executing on the communication device. In some embodiments, token request module 308 working in conjunction with the processor 301 may also track which token is provided to a particular communication device by storing this information in database 303. Thus, database 303 may include a mapping between a communication device and the token provisioned to that communication device.

Cryptography engine 322 (which may work with a separate data processor in the HSM 320) may provide cryptographic functionalities for application provider computer 300. In some embodiments, cryptography engine 322 can be implemented in HSM 320, which is a specialized hardware component used to perform cryptographic operations and manage cryptographic keys. Cryptography engine 322 may be programmed to implement and perform encryption/decryption operations for application provider computer 300 using encryption algorithms such as such as AES, DES, TDES, or other suitable encryption algorithms using cryptographic keys of any length (e.g., 56-bit, 128-bit, 169-bit, 192-bit, 256-bit, etc.). In some embodiments, cryptography engine 322 can also be programmed to perform hash calculations using hash functions such as secure hash algorithm (SHA), or the like. For example, when application provider computer 300 receives a session key used for encrypting credentials from a server computer, application provider computer 300 may invoke cryptography engine 322 to encrypt the session key, such that session key can be provided to the application on the communication device in an encrypted form. In some embodiments, the session key can be encrypted using a hash value that is computed over the user authentication data associated with the user requesting the credential.

Figure 4:
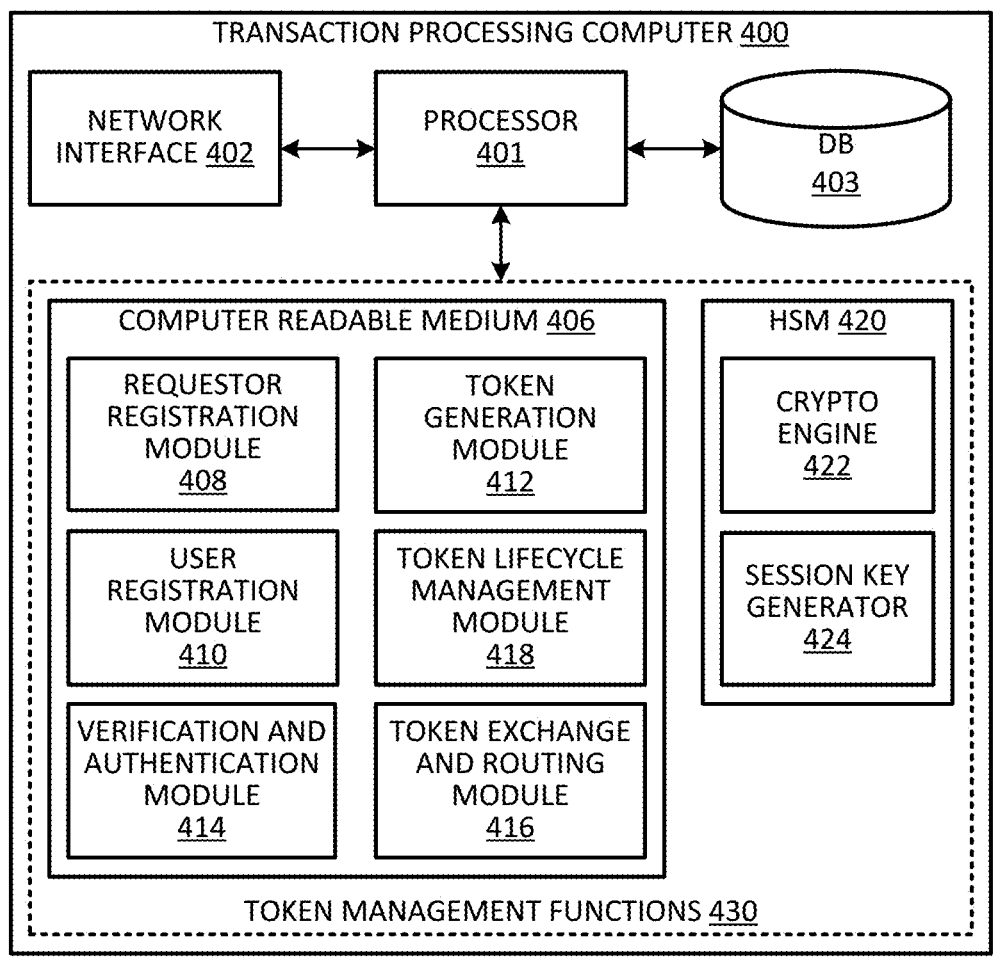
FIG. 4 shows a block diagram of a transaction processing computer according to embodiments of the present invention.

FIG. 4 shows a block diagram of a transaction processing computer 400 according to embodiments of the present invention. Transaction processing computer 400 may be used to implement transaction processing computer 150 of FIG. 1, for example, and may be a token server computer or comprise a token server computer. Transaction processing computer 400 may include a processor 401 coupled to a network interface 402 and a computer readable medium 406. In some embodiments, server computer 400 may also include a hardware security module (HSM) 420. Transaction processing computer 400 may also include a token registry that may be internal or external to transaction processing computer 400.

Processor 401 may include one or more microprocessors to execute program components for performing the token management functions 430 of transaction processing computer 400. Network interface 402 may be configured to connect to one or more communication networks to allow transaction processing computer 400 to communicate with other entities such as a communication device operated by a user, an application provider computer or a token request computer, resource provider computer (e.g., merchant computer), transport computer (e.g., acquirer computer), authorizing entity computer (e.g., issuer computer), etc. Computer readable medium 406 may be as described with respect to computer readable medium 306 of FIG. 3. Computer readable medium 406 may store code executable by the processor 401 for implementing some or all of the token management functions 430 of transaction processing computer 400 described herein. For example, computer readable medium 406 may include a requestor registration module 408, a user registration module 410, a token generation module 412, a verification and authentication module 414, a token exchange and routing module 416, and a token life-cycle management module 418.

Requestor registration module 408 may, in conjunction with the processor 401, register a token requestor entity (e.g., application provider) with the database 403, and to generate a token requestor identifier (ID) for the registered entity. Each registered entity can use their respective token requestor ID as part of a token service request to facilitate identification and validation of the entity. In some embodiments, a token requestor entity may provide token requestor information to the requestor registration module 408 such as an entity name, contact information, an entity type (e.g., merchant, wallet provider, payment service provider, issuer, payment enabler, acquirer, etc.). In some embodiments in which the token is transaction related, the token requestor information may also include token presentment modes (e.g., scan, contactless, e-commerce, etc.), token type (e.g., primary token, subtoken, payment identifier, static/dynamic, payment/non-payment), integration and connectivity parameters, and services subscribed (e.g., token request, authentication and verification, life-cycle management, etc.) and any other relevant information for the onboarding process.

User registration module 410 may, in conjunction with the processor 401, perform registration of users and accounts of the users. In some embodiments, transaction processing computer 400 may allow authorized entities to register consumer accounts (e.g., payment or financial accounts) with the network token system on behalf of the users. For example, a registered token requestor may provide a token requestor ID (e.g., received at the time of registration from the requestor registration module 408), an account identifier or other sensitive information or sensitive information identifier for which a token can substitute, a consumer name and contact information, device identifier of the consumer's communication device, a token type, and any other relevant information for individual account registration or bulk account registration. In some embodiments, user registration module 410 working in conjunction with the processor 401 may store the account details and sensitive information in database 403 for all successful activation and registration requests. In some embodiment, an authorized entity may also unregister users and accounts by providing the necessary information to transaction processing computer 400.

Token generation module 412 can be programmed to generate and/or provide a token that is associated with sensitive data (e.g., account information or a primary token). For example, the token generation module 412 may generate a primary token that can be used as a substitute for a real account identifier (e.g., a Primary Account Number (PAN) of an account), and maintain a stored association (e.g., mapping) between the primary token and the PAN, such that a token exchange module 416 is able to "translate" the primary token back to the original PAN. In some embodiments, the primary token is mathematically derived from the original PAN. In other embodiments, the primary token is randomly generated with respect to the original PAN, and is simply linked to it in a data table. Regardless of how the primary token is generated from the PAN and vice versa, the use of a primary token instead of a real account identifier during a transaction can provide enhanced security. In some embodiments, the primary token and/or information regarding the primary token may be stored in a token vault.

In some embodiments, the token generation module 412 may also generate subtokens based on primary tokens. A subtoken may be associated with the same user as the primary token. The subtoken can be used as a substitute for the primary token. Further, the token generation module 412 can maintain a stored association (e.g., mapping) between the subtoken and the primary token, such that the token exchange module 416 is able to "translate" the subtoken back to the primary token, and in some embodiments, the primary token back to the original credential. In some embodiments, the subtoken is mathematically derived from the primary token. In other embodiments, the subtoken is randomly generated with respect to the primary token, and is simply linked to it in a data table. The subtoken may be, for example, a one-time use or limited use token. The use of a subtoken instead of a primary token during a transaction can provide even further enhanced security, as the subtoken is not directly associated with a credential. In some embodiments, the subtoken and/or information regarding the subtoken may be stored in a token vault.

In some embodiments, token generation module 412 may be programmed to receive a token requestor ID and an account identifier or sensitive information identifier. In some embodiments, token generation module 412 may also be programmed to receive optional information such as a user name, a user address and zip code, a requested token or sensitive information type (e.g., primary token, subtoken, static, dynamic, non-payment, etc.), device identifier, and/or suitable information. In some embodiments, token generation module 412 may be programmed to generate a response with the requested token or requested sensitive information, a token expiration date associated with the token, and/or a token assurance level associated with the token. In some embodiments, token generation module 412 may be programmed to validate the token requestor ID and maintain the correlation between the token, the sensitive information, primary token or account identifier being substituted by the token, and the associated token requestor. In some embodiments, token generation module 412 may be programmed to determine if a token already exists in the database 403 for a token request before generating a new token. In some embodiments, if a token cannot be provisioned, the token response may include a corresponding reason code. In some embodiments, token generation module 412 may also be programmed to provide an interface to the token requestors to submit a bulk token request file.

In some embodiments, the token may be generated on the fly using API calls. For example, when a request is received to tokenize an account identifier or a primary token, token generation module 412 may determine a token range to assign the token. The token range may be assigned based on whether the issuer is provisioning the token (e.g., issuer assigned token range) or the transaction processing network is provisioning the token on behalf of the issuer (e.g., transaction processing network assigned token range). As an example, if the transaction processing network assigned token range includes "442400000-442400250," then "4424000000005382" may be assigned as a token value.

Verification and authentication module 414 may, in conjunction with the processor 401, execute a consumer verification and authentication process, and determine a token assurance level based on the outcome of the verification and authentication process. For example, the verification and authentication module 414, working in conjunction with the processor 401, can perform consumer authentication and verification through a configured authentication scheme. In some embodiments, the authentication scheme may include verification of the account identifier, verification values, the expiration date, and/or a delivery channel identifier based on the customer information stored in a database associated with the transaction processing network. In some embodiments, the authentication scheme may include direct verification of the consumer by the issuer using consumer tokens for their online banking system.

In some embodiments, user registration, token generation, and verification and authentication may be performed as part of processing a single token request process. In some embodiments, for bulk requests, user registration and token generation may be performed by processing a bulk file from the token requestor. In such embodiments, consumer verification and authentication may be performed in a separate step. In some embodiments, the token requestor can request that the authentication and verification process be performed independently multiple times for a particular account to reflect any changes to the levels of assurance for the token over time.

Token exchange and routing module 416 may, in conjunction with the processor 401, process requests for any underlying sensitive information (e.g., an account number or a primary token number) associated with a given token. For example, a transaction processing network, acquirer, issuer, etc. may issue a request for a token exchange during processing of a transaction. Token exchange and routing module 416 may, in conjunction with the processor 401, validate that the requesting entity is entitled to make a request for a token exchange. In some embodiments, token exchange and routing module 416 may, in conjunction with the processor 401, validate the account identifier (or other sensitive information) to token mapping and presentment mode based on the transaction timestamp and the token expiration timestamp. Token exchange and routing module 416 may, in conjunction with the processor 401, retrieve the account identifier or primary token (or other sensitive information) from token registry 404, and provide it along with the assurance level to the requesting entity. In some embodiments, if the account identifier (or other sensitive information) to token mapping is not valid for the transaction timestamp and presentment mode, an error message may be provided.

Token life-cycle management module 418 may, in conjunction with the processor 401, perform life-cycle operations on the tokens managed by transaction processing computer 400. Life-cycle operations may include canceling a token, activating or deactivating a token, updating token attributes, renewing a token with a new expiration date, etc. In some embodiments, a token requestor entity may provide a token requestor ID, a token number, a life-cycle operation identifier and one or more token attributes to transaction processing computer 400 to perform the requested life-cycle operation on a given token. Token life-cycle management module 418 may verify the token requestor ID and the token association based on information in database 403. Token life-cycle management module 418 may, in conjunction with the processor 401, perform the requested life-cycle operation on a given token, and update the corresponding associations in database 403. Examples of life-cycle operation may include a token activation operation to activate an inactive, suspended, or temporarily locked token and its associations; a token de-activation operation to temporarily lock or suspend a token; a cancel token operation to permanently mark a token and its associations as deleted to prevent any future transactions, etc. In some embodiments, a deleted token may be used during returns/chargebacks if the same token was used to submit the corresponding original transactions.

According to some embodiments, transaction processing computer 400 may include an HSM 420 to perform secure functions such as encryption and decryption operations and generation of cryptographic keys used for the encryption and decryption operations. HSM 420 may be similar to HSM 320 of FIG. 3, and may include cryptography engine 422 (which may be similar to cryptography engine 322 of FIG. 3) and session key generator 424. For example, for each request that transaction processing computer 400 receives and processes, session key generator 424 may generate a session key that can be unique for each request received from the particular token requestor, or unique to each request associate with a particular user or account. In some embodiments, the session key can be the same or different than the encryption key that is used to establish the secure communication channel (e.g., TLS, SSL, etc.) between the token requestor and transaction processing computer 400. Token generation module 412 may, in conjunction with the processor 401, generate or otherwise retrieve a token to fulfill the request. The session key can be used by cryptography engine 422 and the processor 401 to encrypt that token using an encryption algorithm, and the encrypted token can be provided to the token requestor. In some embodiments, the generated session key is also provided to the token requestor with the encrypted token.

Although transaction processing computer 400 and application provider computer 300 have been described with a HSM implementing only some of their functions, it should be understood that other functionalities of the respective computers (e.g., token generation) can be implemented inside an HSM as well. Furthermore, some or all of the respective HSM functionalities can also be implemented outside of a HSM.

II. Methods

Figure 5:
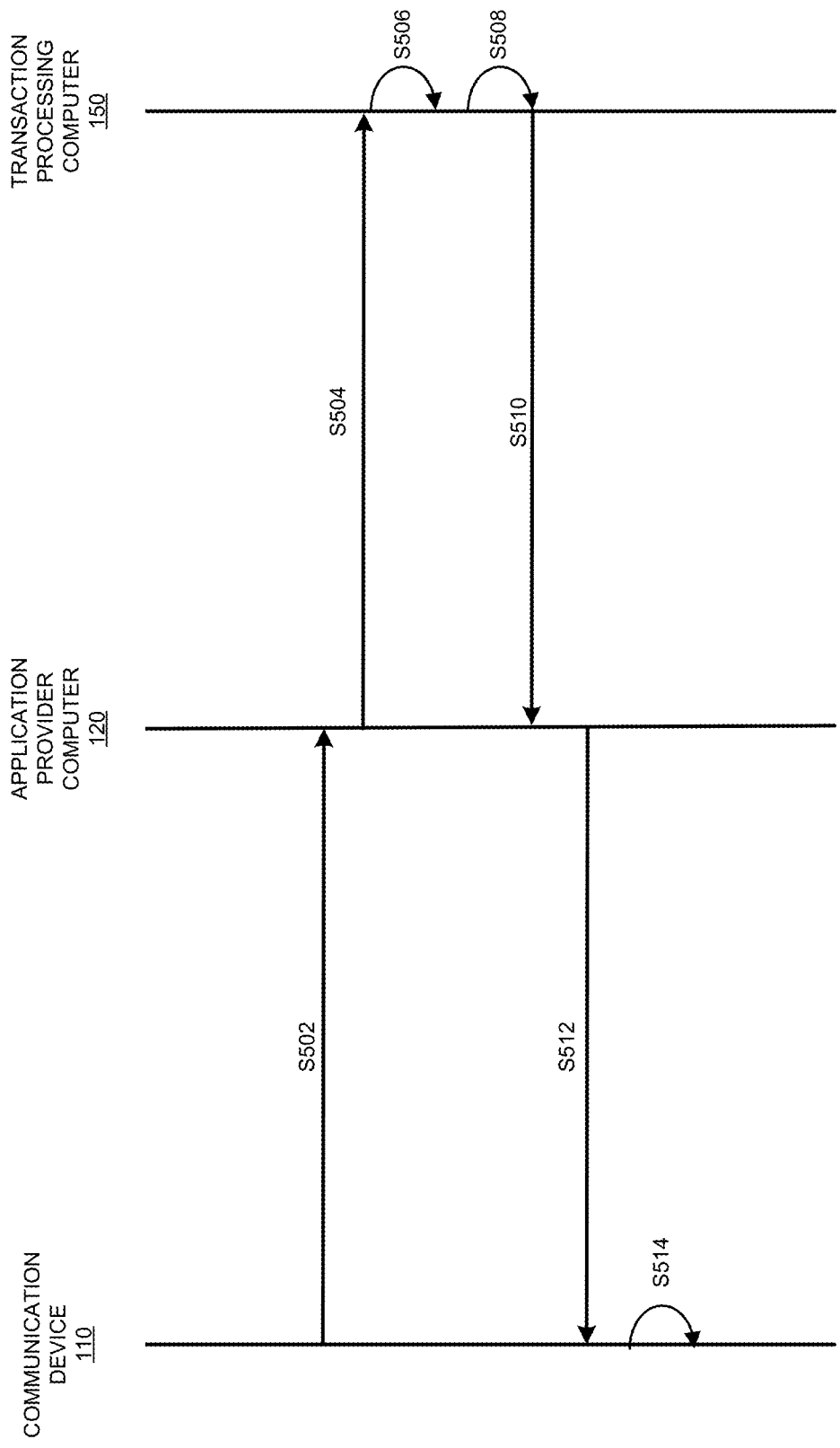
FIG. 5 shows a flowchart of a method for generating a subtoken according to embodiments of the present invention.

A method according to the embodiments of the invention can be described with respect to FIG. 5, which shows a flow diagram illustrating a method for generating a subtoken according to embodiments of the present invention. FIG. 5 includes communication device 110, application provider computer 120, and transaction processing computer 150. FIG. 5 may be described with reference to FIG. 1.

At step S502, the communication device 110 requests that a subtoken be generated based on a primary token, and optionally, conducts an enrollment process with application provider computer 120. The request includes an identification of the primary token and any relevant data associated with the primary token (e.g., a limited use key, derivation data, a token validation cryptogram, etc.). The token may comprise a header, a middle portion, and a check digit. The header may be associated with an authorizing entity that issued the token and/or issued the credential underlying the primary token. In one embodiment, the header is up to 9 digits, the middle portion is 9 or more digits, and the check digit is 1 digit, resulting in a 19 digit token.

The communication device 110 may communicate with the application provider computer 120 over a communication network. The enrollment process may be conducted prior to a request (e.g., a transaction or access request) by the communication device 110. The request and/or enrollment process may enable a subtoken to be provisioned on communication device 110. At step S504, the application provider computer 120 forwards the request for the subtoken to the transaction processing computer 150.

At step S506, the transaction processing computer 150 generates an obfuscated portion using the primary token and the data associated with the primary token. The obfuscated portion may be, for example, a random or mathematically derived value that is encrypted or stored in a look-up table in association with the primary token and the data. The obfuscated portion may serve as a pointer to the token and the data in the look-up table, or may be decrypted to obtain the token and the data. In one embodiment, the obfuscated portion comprises nine or more characters (e.g., digits).

For a particular header, the transaction processing computer 150 may ensure that the obfuscated portion that is generated will not be a duplicate of any other obfuscated portion that may have been generated, but not yet invalidated. In other words, in the case of a one-time use subtoken, the transaction processing computer 150 may ensure that there is not already another subtoken with the same header and obfuscated portion that has not yet been used for a transaction.

At step S508, the transaction processing computer 150 generates a subtoken associated with the primary token. The subtoken includes a header, the obfuscated portion, and the same check digit as the token. The header may be associated with the transaction processing computer 150, such that when the subtoken is used to conduct a transaction, the subtoken is routed to the proper transaction processing computer 150 for translation into the primary token and/or credential. In one embodiment, the header is up to 9 digits, the obfuscated portion is 9 or more digits, and the check digit is 1 digit, resulting in a 19 digit subtoken.

In one embodiment, the subtoken is the same length as the primary token. The subtoken may have associated limits or conditions on its use. For example, the subtoken may be designated as a limited use or one-time use subtoken. Other limitations or conditions may relate to the amount of the transaction, the types of resource providers that can use the subtoken, and the like.

At step S510, the transaction processing computer 150 sends the subtoken to the application provider computer 120. At step S512, the application provider computer 120 provides the subtoken to the communication device 110 (e.g., provisions the subtoken on the communication device 110).

At step S514, the communication device 110 optionally generates a bar code using the subtoken. The bar code is a representation of the subtoken that may be scanned by resource providers or access devices, for example, and may be used to initiate transactions, as described further herein. Although described with respect to a bar code, it is contemplated that any other scannable or interpretable code may be generated using the token (e.g., a QR code).

In this example, the bar code may only contain the subtoken without additional associated data. It may not have additional information such as a separate token validation cryptogram that might otherwise be used to help verify the subtoken. Bar codes, and in particular, one-dimensional bar codes, cannot carry large amounts of information. As will be apparent from the description herein, embodiments of the invention can provide for the benefits of a secure tokenization system, even though a bar code that is initially used to conduct a transaction cannot carry all of the data that might be needed in a typical token transaction.

Figure 6:
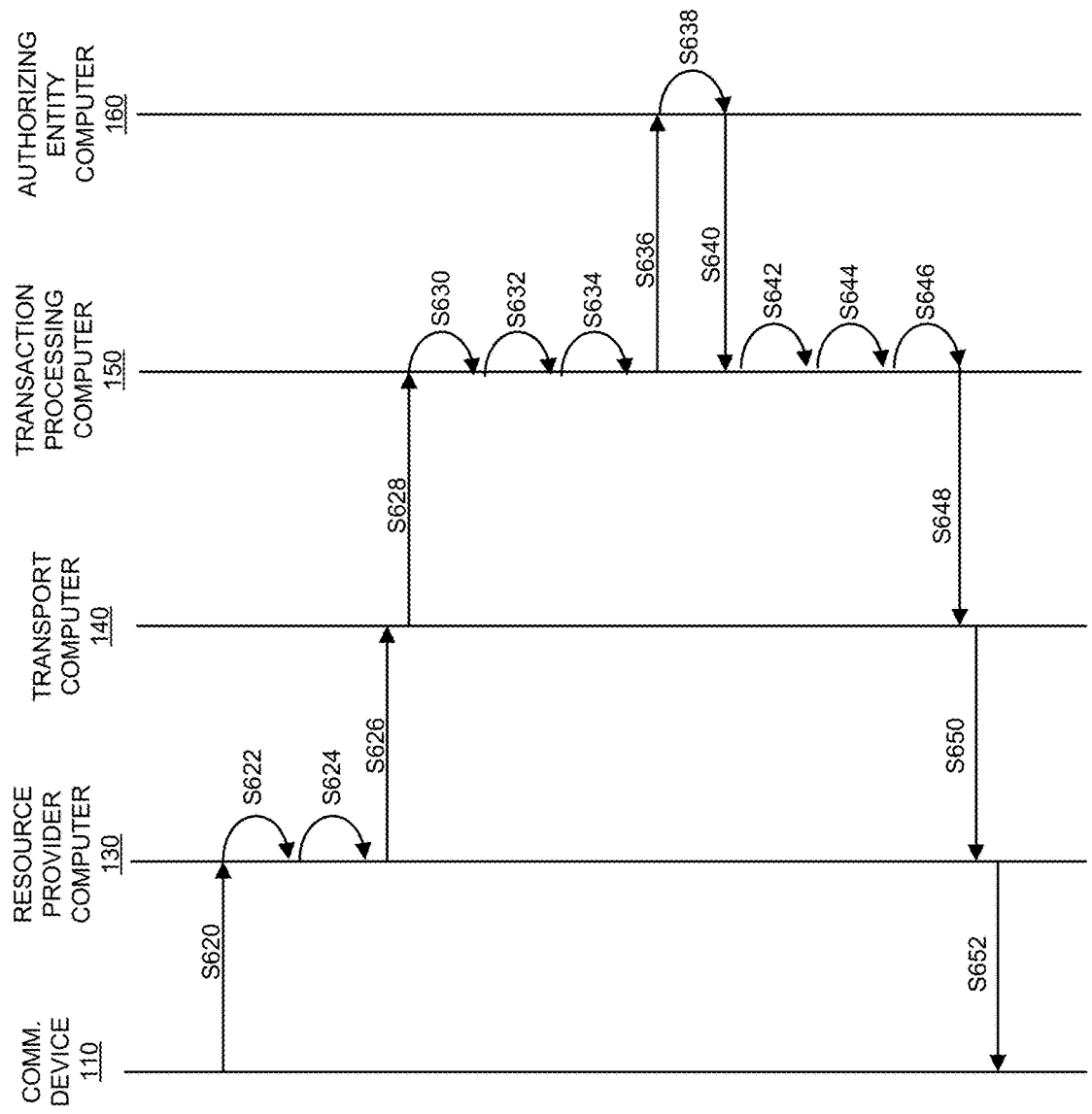
FIG. 6 shows a flowchart of a method for processing a transaction with a subtoken according to embodiments of the present invention.

FIG. 6 shows a flowchart of a method for processing a transaction with a subtoken according to embodiments of the present invention. FIG. 6 includes communication device 110, resource provider computer 130, transport computer 140, transaction processing computer 150, and authorizing entity computer 160. FIG. 6 may be described with reference to FIG. 1, and may be performed at some point after the flowchart depicted in FIG. 5.

At step S620, in one embodiment, communication device 110 displays a bar code representing a subtoken to initiate a payment transaction with a resource provider computer 130. The bar code may be displayed, for example, by an application residing on communication device 110. In other embodiments, other scannable and/or interpretable codes may be provided by the communication device 110 (e.g., a QR code). In still other embodiments, the subtoken may be provided to the resource provider computer 130 via a contactless interface. At step S622, resource provider computer 130 uses a bar code scanner to scan the bar code displayed on communication device 110 and extract the subtoken from the bar code by interpreting the bar code. The subtoken may include a header, an obfuscated portion, and a check digit.

At step S624, the resource provider computer 130 generates an authorization request message with the subtoken from the bar code and other transaction information (e.g., payment amount, resource provider ID, etc.). At step S626, the resource provider computer 130 transmits the authorization request message to a transport computer 140. The transport computer 140 performs routine processing checks and passes the authorization request message to the transaction processing computer 150 at step S628. The authorization request message may be routed to the transaction processing computer 150 by the header of the subtoken in one embodiment (i.e., the header of the subtoken may be a pointer to the transaction processing computer 150).

At step S630, after the transaction processing computer 150 receives the authorization request message, the transaction processing computer 150 can evaluate the subtoken to determine if it is being used under any previously established limitations or conditions. For example, if the subtoken is for one-time use, the transaction processing computer 150 can verify that this is the first and only time the subtoken has been used for a transaction. Other data in the authorization request message such as a resource provider ID (e.g., a merchant ID) and/or a transaction amount may also be evaluated against conditions for use that may be stored by the transaction processing computer 150. As an illustration, the subtoken may only be useable at a particular type of merchant (e.g., grocery stores) and/or may have a transaction limit, such as $500 associated with it. If these conditions are not satisfied, then the transaction may be declined by the transaction processing computer 150. The transaction processing computer 150 may then generate and send an authorization response message back to the resource provider computer 130 that ultimately informs the user of communication device 110 that the transaction was denied.

If the subtoken satisfies all conditions of use, then the transaction processing computer 150 can then use the obfuscated portion of the subtoken to produce an underlying primary token and data associated with the primary token. In some embodiments, the obfuscated portion may be used as a pointer to the primary token and the data in a look-up table. In other embodiments, the obfuscated portion may be decrypted or otherwise mathematically manipulated to obtain the primary token and the data associated with the primary token. The data associated with the primary token may include, for example, a limited use key and other derivation data. The primary token may include a header, a middle portion, and the same check digit as the subtoken. The header of the primary token may be associated with an authorizing entity.

In some cases, the limited use key may be used to generate a token validation cryptogram and may normally accompany the primary token when conducting a transaction. The limited use key may be periodically changed at the transaction processing computer 150 (e.g., every five days, every five transactions, or after a set cumulative transaction amount) so that any token validation cryptograms generated therefrom are also of limited use. This improves transaction security, because if the token validation cryptogram and the primary token are obtained by an unauthorized person, that person would only be able to use the token validation cryptogram and the primary token for a short period of time.

As is apparent from this process flow, the transaction processing computer 150 can generate the data (e.g., a separate token validation cryptogram) that would otherwise be necessary to conduct a token-based transaction even though the initial way of providing data from the communication device 110 to the resource provider computer 130 can only carry limited data (e.g., through the use of a one-dimensional bar code).

Note that the primary token, limited use key, and token validation cryptogram may also be stored on the communication device 110 or another device operated by the user. As described herein, the primary token and the token validation cryptogram may be transmitted by the communication device 110 in situations where there is an adequate mechanism for transferring data between the communication device 110 and the resource provider computer 130. For instance, if the communication device 110 and the resource provider computer 130 can communicate via NFC, Bluetooth, Wi-Fi, or multi-dimensional codes (e.g., multi-dimensional bar codes), then the primary token and the token validation cryptogram generated from the limited use key on the communication device 110 may be used instead of the subtoken.

At step S632, the transaction processing computer 150 retrieves a credential associated with the token through a look-up table. The credential includes a header, a center portion, and the same check digit as the token and subtoken. The same check digit is used between the credential, the token, and the subtoken in order to prevent immediate error detection by the transaction processing computer 150 or other parties to the transaction, such as the acquirer or issuer. The header of the credential may also be associated with an authorizing entity, and may be the same header as the token. At least the center portion of the credential is different than the middle portion of the token, such that the same value is not used for both the credential and the token.

At step S634, the transaction processing computer updates the authorization request message with the credential. At step S636, the transaction processing computer transmits the authorization request message with the credential to the authorizing entity computer 160. At step S638, the authorizing entity computer 160 makes an authorization decision using the credential and generates an authorization response message. For example, the authorizing entity computer 160 may determine if the account associated with the credential in the authorization request message has sufficient funds or credit, and may also determine if the transaction exceeds a predetermined fraud threshold. At step S640, the authorizing entity computer 160 sends the authorization response message with the credential to the transaction processing computer 150.

At step S642, the transaction processing computer 150 retrieves the primary token associated with the credential. At step S644, the transaction processing computer 150 retrieves the subtoken associated with the primary token. At step S646, the transaction processing computer 150 updates the authorization response message to include the subtoken. At this point, if the transaction has been authorized, the transaction processing computer 150 may invalidate the subtoken if it is a one-time use subtoken.

At step S648, the transaction processing computer 150 sends the authorization response message including the subtoken to the transport computer 140. At step S650, the transport computer 140 sends the authorization response message including the subtoken to the resource provider computer 130. The resource provider computer 130 will then store the subtoken in its records instead of the credential or primary token. No sensitive data associated with the user of communication device 110 is exposed to the resource provider computer 130 in the above-noted process. At step S652, the resource provider computer 130 provides communication device 110 (or a user of communication device 110) with an indication of whether the transaction was authorized or denied.

At a later point in time, a clearing and settlement process can occur between the transport computer 140, the transaction processing computer 150, and the authorizing entity computer 160. The resource provider computer 130 may first provide a file with the subtoken and the associated transaction data to the transport computer 140. The transport computer 140 may then transmit any clearing and settlement messages to the transaction processing computer 150 using the subtoken. The subtoken may then be converted to the credential as described above in the authorization process to facilitate the exchange of messages and the transfer of funds between the transport computer 140 and the authorizing entity computer 160.

Although described with respect to FIG. 6 as being performed by a single transaction processing computer 150, it is contemplated that one or more of steps S630-S646 may be performed by a separate token server that is external to transaction processing computer 150. For example, a token server may obtain the primary token from the subtoken at step S630; obtain the credential from the primary token at step S632; obtain the primary token from the credential at step S642; and/or obtain the subtoken from the primary token at step S644.

Additionally or alternatively, it is contemplated that one or more of steps S630-S646 may be performed by the authorizing entity computer 160, instead of the transaction processing computer 150. For example, the authorizing entity computer 160 may instead receive an authorization request message containing the primary token from transaction processing computer 150 at step S636, and may thereafter retrieve the credential associated with the primary token itself. This embodiment may be implemented in instances in which the authorizing entity computer 160 issues the primary token instead of the transaction processing computer 150, for example.

While the example above describes subtokens generated from a primary token, embodiments are not so limited. For example, it may be possible for the user of communication device 110 to create a one-time use token directly from a credential associated with their account. During a purchase, the user would use the one-time use token.

Also, while the above example describes the presentation of a subtoken by a communication device 110 to a resource provider computer 130, in other embodiments, the subtoken may be present in the form of a one-dimensional bar code or just a number that is 20 digits or less, for example, that might be printed on a card of a piece of paper.

Embodiments of the invention may provide a number of advantages. The invention enables users to easily obtain subtokens, such as one-time use subtokens for each transaction, maximizing security for the underlying account. The number of entities across a transaction system having access to a credential or a high value token (i.e., a token directly related to a credential) is minimized. This can ensure security of the transaction as no sensitive data is exposed to the resource provider or merchant, from whom fraud can originate. Further, because the subtoken can be for one-time use, the subtoken number can change for each and every transaction. Thus, if the subtoken number is improperly obtained once during a transaction, it can never be used again to perform a transaction on the underlying account.

Another advantage of embodiments of the invention is that the use of the subtoken, without an additional token validation cryptogram, can be used in situations where the ability to transfer larger amounts of data are not available. Even though additional data such as a token validation cryptogram is not used in the initial transfer of data from the user, embodiments of the invention can still benefit from the transaction security and convenience of token-based processing systems.

Generating subtokens associated with an original token that may be distributed to authorized entities can be applied outside of financial transaction contexts as well. For example, embodiments of the invention may be utilized to designate certain access privileges to an individual who may provide a subtoken in order to be granted access.

Figure 7:
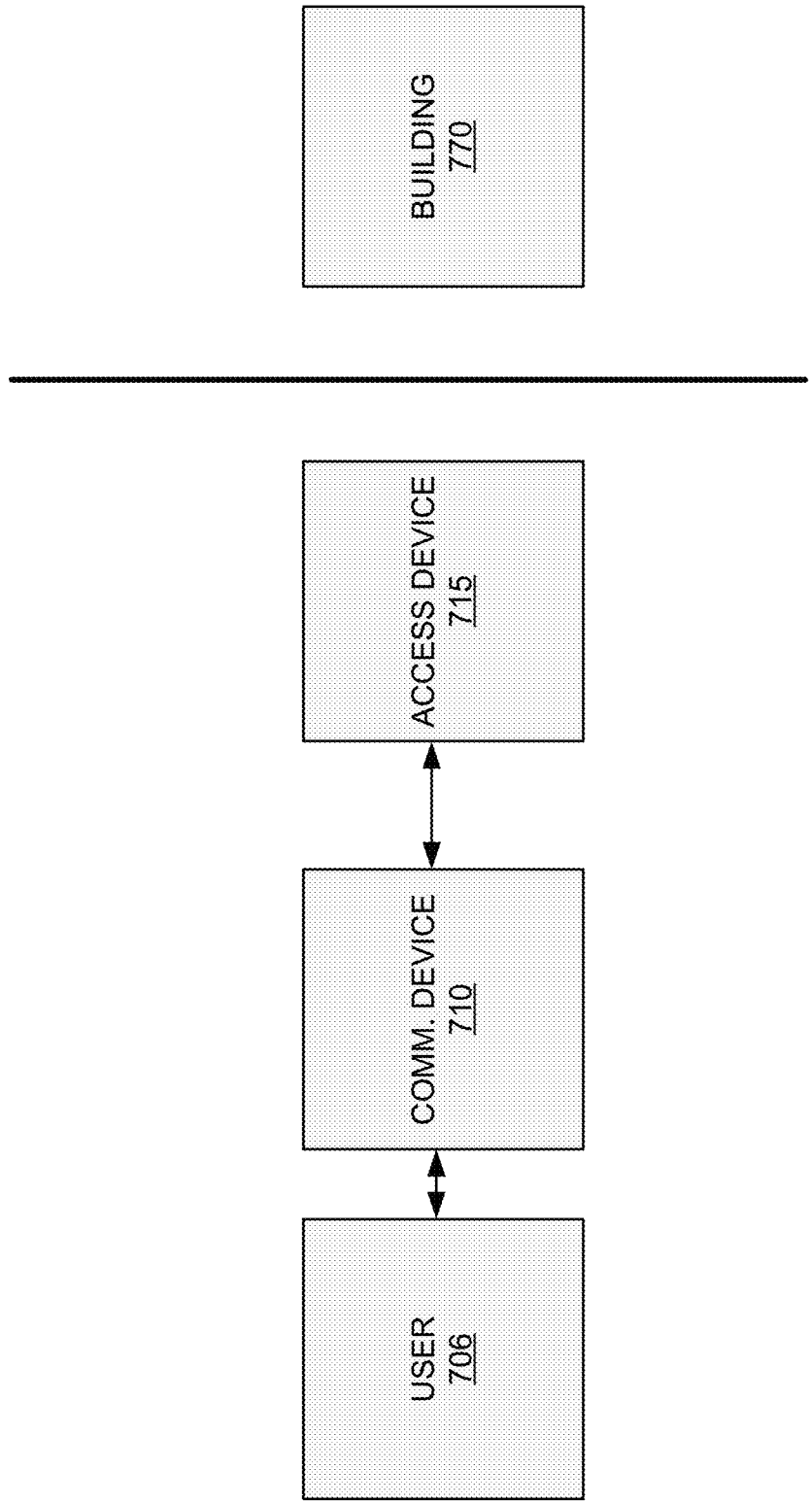
FIG. 7 shows a block diagram of a building access system according to embodiments of the present invention.

FIG. 7 shows a block diagram of a building access system according to embodiments of the invention. A user 706 operates a communication device 710 having a token. User 706 may request a subtoken to provide further security for the token and the underlying credential. Thereafter, communication device 710 can interact with access device 715 and pass the subtoken to access device 720. The access device 715 may locally analyze the subtoken to determine whether access should be granted to building 770, or it may communicate with a remotely located server computer (not shown). The remotely located server computer may analyze the security notification data to determine whether access should be granted to building 770, and may transmit a signal indicating this back to the access device 715. The access device 715 may then proceed to allow or deny access by the user 706 to the building 770, in accordance with the subtoken.

A computer system may be used to implement any of the entities or components described above. The subsystems of the computer system may be interconnected via a system bus. Additional subsystems such as a printer, keyboard, fixed disk (or other memory comprising computer readable media), monitor, which is coupled to display adapter, and others may be used. Peripherals and input/output (I/O) devices, which couple to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although specific functions and methods have been described with respect to transaction processing computer 150 in FIG. 6, such functions could be performed by other computers such as the authorizing entity computer 160, as described herein.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

receiving, by a server computer, a first subtoken request message from a user device via an application provider computer in communication with the user device, wherein the first subtoken request message includes an identification of a primary token generated by the server computer;

generating, by the server computer, a first subtoken based on the primary token including a first header and an obfuscated portion, wherein the first header routes the first subtoken to the server computer, wherein the first subtoken is a substitute identifier for the primary token and has a same number of digits as the primary token, and wherein the primary token is a payment token;

receiving, by a server computer, a first authorization request message from a resource provider computer in a first transaction, the first authorization request message comprising a first payment amount and the first subtoken;

using, by the server computer, the obfuscated portion of the first subtoken to determine the primary token and data associated with the primary token, the primary token including a second header and a middle portion, wherein the second header is associated with an authorizing entity computer that holds an account of a user;

(i) retrieving, by the server computer, a credential associated with the primary token, wherein the credential is a primary account number of the account of the user, the credential including the second header and a center portion, wherein the center portion of the credential is different than the middle portion of the primary token, and authorizing, by the server computer, the first transaction with the credential, or (ii) sending, by the server computer, the primary token to the authorizing entity computer, wherein the authorizing entity computer retrieves the credential associated with the primary token, and authorizes the first transaction with the credential, wherein the credential is the primary account number for the account of the user, the credential including the second header and the center portion, wherein the center portion of the credential is different than the middle portion of the primary token;

after the first transaction is authorized, invalidating the first subtoken;

receiving, by the server computer, a second subtoken request message from the application provider computer in communication with the user device, wherein the second subtoken request message includes the identification of the primary token;

generating, by the server computer, a second subtoken based on the primary token, wherein the second subtoken is different than the first subtoken, is a substitute identifier for the primary token, and has the same number of digits as the primary token;

receiving, by the server computer, a second authorization request message in a second transaction, the second authorization request message comprising a second payment amount and the second subtoken;
determining the primary token using the second subtoken;
(iii) retrieving, by the server computer, the credential associated with the primary token, and authorizing, by the server computer, the second transaction with the credential, or
(iv) sending, by the server computer, the primary token to the authorizing entity computer, wherein the authorizing entity computer retrieves the credential associated with the primary token, and authorizes the second transaction with the credential; and
after the second transaction is authorized, invalidating the second subtoken.

2. The method of claim 1, wherein the data associated with the primary token includes a limited use key, and wherein the method further comprises:
generating, by the server computer, a token validation cryptogram using the limited use key, and
retrieving the credential using the primary token and the token validation cryptogram.

3. The method of claim 1, wherein the resource provider computer extracted the first subtoken from a one-dimensional bar code.

4. The method of claim 3, wherein the first subtoken is received from the resource provider computer through a transport computer without a token validation cryptogram.

5. The method of claim 1, further comprising:
updating the first authorization request message by replacing the first subtoken with the credential.

6. The method of claim 1, wherein using the obfuscated portion of the first subtoken comprises:
locating the primary token and the data associated with the primary token in a database, wherein the primary token and the data associated with the primary token are stored in the database in association with the obfuscated portion.

7. The method of claim 1, wherein the method comprises the (ii) sending, by the server computer, the primary token to the authorizing entity computer.

8. The method of claim 1, wherein the method comprises the (i) retrieving, by the server computer, the credential associated with the primary token, and authorizing, by the server computer, the first transaction with the credential.

9. The method of claim 1, wherein the first subtoken, the primary token, and the credential comprise a same check digit.

10. The method of claim 1, wherein the center portion of the primary token is mathematically derived from the center portion of the primary account number.

11. The method of claim 1, further comprising:
generating, by the server computer, the primary token; and
transmitting, by the server computer, the primary token to the user device.

12. A server computer comprising:
a processor; and
a memory element comprising code, executable by the processor, for implementing a method comprising:
receiving a first subtoken request message from a user device via an application provider computer in communication with the user device, wherein the first subtoken request message includes an identification of a primary token generated by the server computer;
generating a first subtoken based on the primary token including a first header and an obfuscated portion, wherein the first header routes the first subtoken to the server computer, wherein the first subtoken is a substitute identifier for the primary token and has a same number of digits as the primary token, and wherein the primary token is a payment token;
receiving a first authorization request message from a resource provider computer in a first transaction, the first authorization request message comprising a first payment amount and the first subtoken;
using the obfuscated portion of the first subtoken to determine the primary token and data associated with the primary token, the primary token including a second header and a middle portion, wherein the second header is associated with an authorizing entity computer that holds an account of a user; and
(i) retrieving a credential associated with the primary token, wherein the credential is a primary account number of the account of the user, the credential including the second header and a center portion, wherein the center portion of the credential is different than the middle portion of the primary token, and authorizing the first transaction with the credential; or
(ii) sending the primary token to the authorizing entity computer, wherein the authorizing entity computer retrieves the credential associated with the primary token, and authorizes the first transaction with the credential, wherein the credential is the primary account number for the account of the user, the credential including the second header and the center portion, wherein the center portion of the credential is different than the middle portion of the primary token, and wherein the primary account number is not the primary token or the first subtoken;
after the first transaction is authorized, invalidating the first subtoken;
receiving a second subtoken request message from the application provider computer in communication with the user device, wherein the second subtoken request message includes the identification of the primary token;
generating a second subtoken based on the primary token, wherein the second subtoken is different than the first subtoken, is a substitute identifier for the primary token, and has the same number of digits as the primary token;
receiving a second authorization request message, the second authorization request message comprising a second payment amount and a second subtoken in a second transaction;
determining the primary token using the second subtoken;
(iii) retrieving the credential associated with the primary token, and authorizing the second transaction with the credential, or
(iv) sending the primary token to the authorizing entity computer, wherein the authorizing entity computer retrieves the credential associated with the primary token, and authorizes the second transaction with the credential; and
after the second transaction is authorized, invalidating the second subtoken.

13. The server computer of claim 12, wherein the data associated with the primary token includes a limited use key, wherein the method further comprises:
   generating a token validation cryptogram using the limited use key, and
   retrieving the credential using the primary token and the token validation cryptogram.

14. The method of claim 2, further comprising:
   changing, by the server computer, the limited use key periodically so that token validation cryptograms generated by the server computer periodically change.

15. The server computer of claim 12, wherein the resource provider computer extracted the first subtoken from a one-dimensional bar code.

16. The server computer of claim 15, wherein the first subtoken is received from the resource provider computer through a transport computer without a token validation cryptogram.

17. The server computer of claim 12, wherein the method further comprises:
   updating the second authorization request message to replace the second subtoken with the credential.

18. The server computer of claim 12, wherein using the obfuscated portion of the first subtoken comprises:
   locating the primary token and the data associated with the primary token in a database, wherein the primary token and the data associated with the primary token are stored in the database in association with the obfuscated portion.

19. The server computer of claim 12, the method comprises (iii) retrieving the credential associated with the primary token, and authorizing the second transaction with the credential.

20. The server computer of claim 12, wherein the method comprises (iv) sending the primary token to the authorizing entity computer, wherein the authorizing entity computer retrieves the credential associated with the primary token, and authorizes the second transaction with the credential.

21. The server computer of claim 12, wherein the first subtoken, the second subtoken, the primary token, and the credential comprise a same check digit.

* * * * *